(12) United States Patent
Kawase et al.

(10) Patent No.: US 6,611,486 B2
(45) Date of Patent: Aug. 26, 2003

(54) RECORDING MEDIUM RECOGNITION INFORMATION RECORDING METHOD, RECORDING MEDIUM RECOGNITION INFORMATION RECORDING APPARATUS, AND RECORDING DISC

(75) Inventors: Hiroshi Kawase, Kanagawa (JP); Masaaki Masuda, Tokyo (JP); Kazuhiro Sato, Kanagawa (JP); Yoshihisa Haruyama, Saitama (JP)

(73) Assignee: Sony Corporation (JP)

( * ) Notice: Subject to any disclaimer, the term of this patent is extended or adjusted under 35 U.S.C. 154(b) by 118 days.

(21) Appl. No.: 09/865,710

(22) Filed: May 29, 2001

(65) Prior Publication Data

US 2002/0012309 A1 Jan. 31, 2002

(30) Foreign Application Priority Data

May 31, 2000 (JP) ........................................ 2000-163343

(51) Int. Cl.⁷ ................................................. G11B 7/00
(52) U.S. Cl. ................................ 369/59.25; 369/59.27; 369/47.55; 369/53.45
(58) Field of Search .......................... 369/47.1, 47.21, 369/47.22, 47.46, 47.55, 53.1, 53.2, 53.31, 53.37, 53.45, 59.1, 59.13, 59.15, 59.16, 59.17, 59.2, 59.23, 59.27, 59.25

(56) References Cited

U.S. PATENT DOCUMENTS 4,984,101 A * 1/1991 Kanota et al. ................ 360/65
6,186,405 B1 * 2/2001 Yoshioka .................... 235/494

* cited by examiner

Primary Examiner—Muhammad Edun
(74) Attorney, Agent, or Firm—Rader, Fishman & Grauer PLLC; Ronald P. Kananen

(57) ABSTRACT

A unique recording medium having identification information such as a serial number or ID number inherent in the recording media as information signals recorded thereon, which is prevented from being easily erased or rewritten, without inducing the complexity of an optical disc reproducing apparatus in its configuration and the intricacy of the reading-out operation is realized. Recognition information is recorded to a recording medium which has a recognition information recording area for recording the recognition information, and at least the recognition information recording area is capable of additionally having information recorded thereto. In recording digitized recognition information to the recognition information recording area, the "1" is modulated to a signal having a first frequency and the "0" is modulated to a signal having a second frequency, and the signals corresponding to their respective frequencies are written to the recognition information recording area.

12 Claims, 4 Drawing Sheets

RECORDING MEDIUM RECOGNITION INFORMATION RECORDING METHOD, RECORDING MEDIUM RECOGNITION INFORMATION RECORDING APPARATUS, AND RECORDING DISC

BACKGROUND OF THE INVENTION

1. Field of the Invention

The present invention relates to a recording medium recognition information recording method and a recording medium recognition information recording apparatus for recording recognition information inherent in recording media to a recording medium, and a recording disc having inherent recognition information recorded thereon.

2. Description of Related Art

Conventionally, there are proposed optical discs of a variety of standards as a recording medium, and also proposed various disc recording and/or reproducing apparatuses for recording/reproducing information signals to/from such optical discs.

As such an optical disc, there is proposed a pit disc or replica disc which has a molded disc substrate on which pits are formed by a stamper and a reflective film adhered to the disc substrate. Since a large quantity of discs having the same information signals can be produced in a short time, such a pit disc is appropriate for recording music software, motion picture software, and computer programs. Thus, such a pit disc is coming into practical use widely as what is called a CD (Compact Disc: trade name) or what is called a DVD-ROM (Digital Versatile Disc-ROM: trade name).

Such a pit disc has recorded thereon information signals in the form of pit strings. And, after the reflective film is adhered to the disc substrate and the pit disc is completed as an optical disc, information signals cannot be additionally recorded to the optical disc.

Since information signals cannot be additionally recorded to a completed optical disc, such an optical disc cannot be a unique recording medium having identification information such as a serial number or ID number inherent in each of recording media as information signals recorded thereon.

Since optical discs having the identification information as information signals can be identified individually, such optical discs are effective in managing stocks and managing customers.

Such identification information may be recorded to an optical disc by injuring (peeling off, or transpiring) a part of a reflective film thereof. However, in case the identification information is recorded to an optical disc in such a manner, another reading-out apparatus for reading out the identification information, apart from an optical pick up used for reading out information signals recorded on the disc in the form of pit strings, is required. As a result, an optical disc reproducing apparatus becomes undesirably complicated in its configuration, while the reading-out operation becomes undesirably intricate.

On the other hand, such identification information may be recorded to an optical disc by forming a magnetic recording area or photomagnetic recording area and recording the identification information to these areas. However, such identification information must be prevented from being easily erased or rewritten by the user of the optical disc, and, in case the identification information is recorded to the magnetic recording area or photomagnetic recording area of an optical disc, the identification information cannot be prevented from being erased or rewritten.

SUMMARY OF THE INVENTION

It is therefore an object of the present invention to overcome the above-mentioned drawbacks by providing a recording medium recognition information recording method and a recording medium recognition information recording apparatus for realizing a unique recording medium having identification information such as a serial number or ID number inherent in each of recording media as information signals recorded thereon, which is prevented from being easily erased or rewritten, without inducing the complexity of an optical disc reproducing apparatus in its configuration and the intricacy of the reading-out operation, and by providing a recording disc as such a unique recording medium.

According to the present invention, there is provided a recording medium recognition information recording method for recording recognition information to a recording medium which has a recognition information recording area for recording the recognition information, at least the recognition information recording area being capable of additionally having information recorded thereto, wherein, in recording digitized recognition information to the recognition information recording area, the "1" is modulated to a signal having a first frequency and the "0" is modulated to a signal having a second frequency, and the signals corresponding to their respective frequencies are written to the recognition information recording area.

Otherwise, according to the recording medium recognition information recording method, in recording digitized recognition information to the recognition information recording area, either the "1" or "0" is modulated to a signal having a constant frequency and the other is modulated to a non-signal state, and the signals corresponding to the constant frequency and the non-signal state are written to the recognition information recording area.

According to the present invention, there is provided a recording medium recognition information recording apparatus for recording recognition information to a recording medium loaded therein, the recording medium having a recognition information recording area for recording the recognition information, at least the recognition information recording area being capable of additionally having information recorded thereto, the recording medium recognition information recording apparatus comprising:

means for recording digitized recognition information to the recognition information recording area, the recognition information recording means modulating the "1" to a signal having a first frequency and modulating the "0" to a signal having a second frequency, and writing the signals corresponding to their respective frequencies to the recognition information recording area.

Otherwise, according to the recording medium recognition information recording apparatus, the recognition information recording means modulates either the "1" or "0" to a signal having a constant frequency and modulates the other to a non-signal state, and writes the signals corresponding to the constant frequency and the non-signal state to the recognition information recording area.

According to the present invention, there is provided a recording disc which has a recognition information recording area for recording recognition information, at least the recognition information recording area being capable of additionally having information recorded thereto, the recognition information recording area having digitized recognition information recorded therein, wherein, of the digitized recognition information recorded in the recognition information recording area, the "1" is modulated to a signal having a first frequency and the "0" is modulated to a signal having a second frequency, and the signals corresponding to their respective frequencies are written to the recognition information recording area.

Otherwise, according to the recording disc, of the digitized recognition information recorded in the recognition information recording area, either the "1" or "0" is modulated to a signal having a constant frequency and the other is modulated to a non-signal state, and the signals corresponding to the constant frequency and the non-signal state are written to the recognition information recording area.

These objects and other objects, features and advantages of the present invention will become more apparent from the following detailed description of the preferred embodiments of the present invention when taken in conjunction with the accompanying drawings.

DESCRIPTION OF THE PREFERRED EMBODIMENTS

The recording medium recognition information recording method according to the present invention can be realized by the recording medium recognition information recording apparatus according to the present invention, and can also be realized by other apparatuses. The recording disc according to the present invention can be produced by the recording medium recognition information recording method according to the present invention, and can also be produced by other methods.

Preferred embodiments according to the present invention will further be described below with reference to the accompanying drawings.

Figure 1:
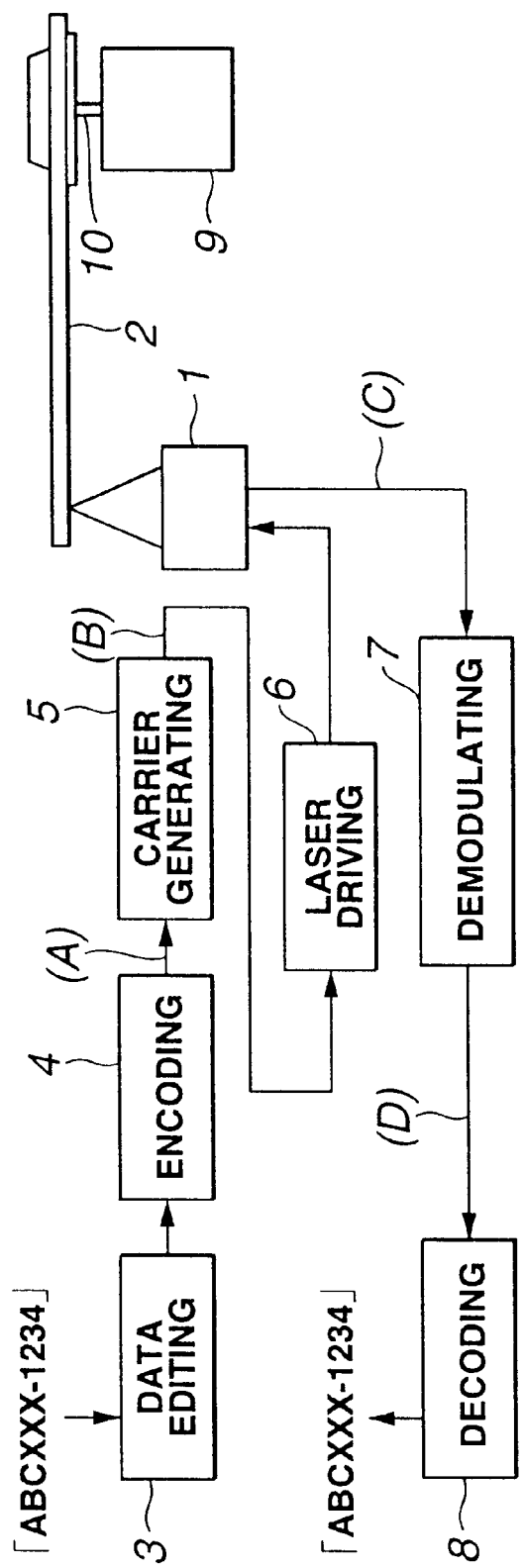
FIG. 1 shows a block diagram of the recording medium recognition information recording apparatus according to the present invention.

The recording medium recognition information recording apparatus according to the present invention includes an optical pick up 1, as shown in FIG. 1. The optical pick up 1 has a laser diode as a laser light source, a lens system for condensing a laser beam irradiated from the laser diode onto a signal recording surface of an optical disc 2 as a recording medium, and a photodetector for detecting a laser beam reflected by the signal recording surface via the lens system.

The optical pick up 1 can write information signals to an optical disc by irradiating a laser beam modulated in intensity in accordance with the information signals to the optical disc. The optical pick up 1 can read out information signals from the optical disc by detecting a reflected laser beam modulated in intensity in accordance with the information signals recorded to the optical disc. The laser diode irradiates a laser beam having a power of approximately scores of mW when writing information signals, which is larger than that of a laser beam irradiated at the time of reading out information signals.

The optical pick up 1 is supported movably between an innermost circumference and an outermost circumference of the optical disc 2 which is supported rotatably in the recording medium recognition information recording apparatus, and can irradiate a laser beam between the innermost circumference and the outermost circumference of the optical disc 2.

The optical disc 2 is what is called a pit disc or replica disc which has a molded disc substrate on which pits are formed by a stamper and a reflective film such as an aluminum film adhered to the disc substrate. The disc substrate is made of synthetic resin material such as polycarbonate. Since a large quantity of discs having the same information signals can be produced in a short time, such a pit disc is appropriate for recording music software, motion picture software, and computer programs. Thus, such a pit disc is coming into practical use widely as what is called a CD (Compact Disc: trade name) or what is called a DVD-ROM (Digital Versatile Disc-ROM: trade name). Information signals (contents information) of music software, motion picture software, and computer programs are recorded to the optical disc 2 in the form of pit strings which are formed by the stamper.

The reflective film of the optical disc 2 is made of, for example, an aluminum-germanium alloy (aluminum containing germanium) which changes in quality and whose reflectivity changes when a laser beam of more than a predetermined power is irradiated thereto by the laser beam energy so that information signals other than those recorded in the form of the pit strings can be additionally recorded to the optical disc after the reflective film is adhered to the disc substrate and the pit disc is completed as an optical disc. That is, the aluminum-germanium reflective film has approximately the same reflectivity as an aluminum reflective film, and does not change in quality when irradiated by a laser beam at the time of reading out information signals. The aluminum-germanium reflective film also changes in quality when irradiated by a laser beam of more than a predetermined power at the time of additionally recording information signals other than those recorded in the form of the pit strings.

With the optical disc 2, information signals can be additionally recorded to either the whole signal recording area or a part of the signal recording area of the optical disc 2. In case information signals will be recorded to a part of the signal recording area of the optical disc 2, this part becomes the recognition information recording area to which recording medium recognition information, to be described later, will be recorded. In case information signals will be recorded to the whole signal recording area of the optical disc 2, the recognition information recording area can be any part of the signal recording area of the optical disc 2.

The recording medium recognition information recording apparatus further includes a spindle motor 9 having a driving shaft 10. The optical disc 2 has its center portion supported by the end of the driving shaft 10, and is rotated by driving power of the spindle motor 9.

The recording medium recognition information recording apparatus further has a recognition information recording means for recording digitized recognition information to the recognition information recording area of the optical disc 2 via the optical pick up 1. The recognition information recording means includes a data editing (recognition information editing) circuit 3, an encoding circuit 4, a carrier generating (carrier frequency signal generating) circuit 5, and a laser driving circuit 6.

Figure 2A:
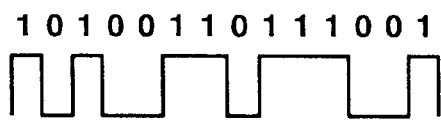
FIGS. 2A, 2B, 2C, and 2D show waveforms of signals output from the components in the recording medium recognition information recording apparatus.

When additionally recording recognition information to the optical disc 2, in the first place, recognition information inherent in the recording media such as a serial number or ID number is sent to the data editing circuit 3, or is generated and edited in the data editing circuit 3. It is noted that a character string "ABCXXX-1234" as recognition information is shown in FIG. 1. This recognition information is sent to the encoding circuit 4. The encoding circuit 4 outputs an output signal (A), as shown in FIG. 1. The output signal (A) is a digitized signal (bit stream) consisting of the digital "1" ("H") and digital "0" ("L"), as shown in FIG. 2A.

Figure 2B:

The digitized identification signal is sent to the carrier generating circuit 5. The carrier generating circuit 5 modulates the "1" to a signal (carrier) having a first frequency, and modulates the "0" to a signal (carrier) having a second frequency. The first frequency is, for example, 1.1 MHz, and the second frequency is, for example, 1.3 MHz. The numerical values of the first frequency and second frequency are appropriately determined by taking the frequency of the information signals recorded in the form of the pit strings into consideration. The carrier generating circuit 5 outputs an output signal (B), as shown in FIG. 1. The output signal (B) consists of sinusoidal waves having the first frequency for the "1" period and sinusoidal waves having the second frequency for the "0" period, as shown in FIG. 2B.

The output signal from the carrier generating circuit 5 is sent to the laser driving circuit 6. The laser driving circuit 6 modulates the irradiating power of the laser diode of the optical pick up 1 in accordance with the received signal. Thus, the laser beam irradiated from the laser diode is the identification signal which is digitized and modulated in intensity in accordance with the signal having the first frequency and the signal having the second frequency.

Since the laser beam irradiated from the laser diode is modulated in intensity in accordance with the identification signal, the optical pick up 1 can write a signal corresponding to the identification signal to the reflective film of the optical disc 2. The area where the signal corresponding to the identification signal will be written, that is the position of the recognition information recording area of the optical disc 2 will be described later.

On the other hand, the carrier generating circuit 5 may modulate either the "1" or "0" to a signal (carrier) having a constant frequency, and modulate the other to a non-signal state.

As described above, with the recording medium recognition information recording method according to the present invention, in recording the recognition information to the recognition information recording area of the recording medium to which the recognition information can be additionally recorded, the recognition information is digitized, and the "1" is modulated to the signal (carrier) having the first frequency and the "0" is modulated to the signal (carrier) having the second frequency, and signals having the first frequency and second frequency which correspond to the recognition information are written. The recording medium is a pit disc which has a molded disc substrate on which pits are formed by a stamper and a reflective film adhered to the disc substrate, and the reflective film is made of, for example, an aluminum-germanium alloy. Furthermore, in recording the digitized recognition information to the recognition information recording area, either the "1" or "0" may be modulated to a signal (carrier) having a constant frequency, while the other being modulated to a non-signal state, and the signals corresponding to the constant frequency and the non-signal state are written to the recognition information recording area. The optical disc 2 having the identification information recorded thereon is the preferred embodiment of the recording disc according to the present invention.

Figure 2C:

The identification information thus recorded to the optical disc 2 can be read out by the recording medium recognition information recording apparatus via the optical pick up 1. That is, when the laser diode of the optical pick up 1 irradiates a laser beam which does not change the reflective film in quality and the laser beam reflected from the reflective film is detected, at the area where the identification information is recorded, an output signal (C) which has the same waveform as that of the output signal (B) from the carrier generating circuit 5 can be obtained due to inequality in the reflectivity of the reflective film caused by additional recording of the identification information, as shown in FIG. 1. The waveform of the output signal (C) is shown in FIG. 2C.

Figure 2D:

The recording medium recognition information recording apparatus further includes a demodulating circuit 7 and a decoding circuit 8. The output signal from the optical pick up 1 is sent to the demodulating circuit 7. Then, the output signal undergoes signal processing such as band-pass filtering and is separated into two frequency components of the first frequency and second frequency. The two frequency components have their carrier components removed, and the resulting signal (D) is sent to the decoding circuit 8 as a digital signal (bit stream), as shown in FIG. 1. The waveform of the signal (D) is shown in FIG. 2D. The decoding circuit 8 decodes the digital signal from the demodulating circuit 7 and returns the digital signal to the original identification information, that is for example, the character string "ABCXXX-1234".

When the bands of the first and second frequency (carrier frequency) of the identification information are sufficiently higher than that of the information signals recorded in the form of the pit strings, this identification information can be written over the information signals recorded in the form of the pit strings. Thus written identification information is scarcely influenced by various external disturbances when writing the identification information, and is also scarcely influenced by damages formed on the disc substrate when reading the identification information, compared to identification information whose digital signal (bit stream) is directly written to an optical disc. Furthermore, since the identification information is digitized and the "1" and "0" are modulated to the signals having the first and second frequency, thus written identification information is not easily damaged or lost, and, even though when damaged, if the damage is not large, the identification information can be read out by signal processing of the decoding circuit and software.

Figure 3:
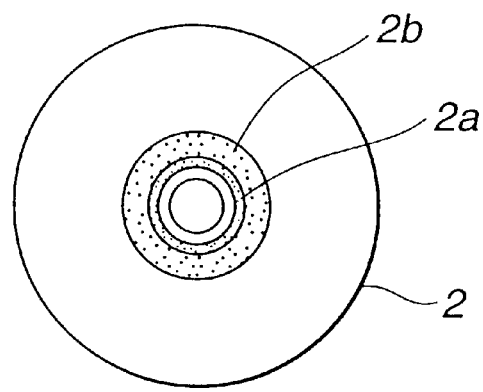
FIG. 3 shows a plan view of an optical disc for use in the recording medium recognition information recording method and recording medium recognition information recording apparatus according to the present invention.

Next, the part of the optical disc 2 where the identification information will be written, that is, the recognition information recording area of the optical disc 2 will be discussed. It can be considered that the recognition information recording area may be lead-in area 2b or inside lead-in area 2a which is located at the inside of the lead-in area 2b, as shown in FIG. 3.

The lead-in area 2b is an area from which information signals are firstly read out when an optical disc is loaded on an optical disc reproducing apparatus, and what is called TOC (table of contents) information is recorded in the lead-in area 2b. A general optical disc reproducing apparatus does not read out information signals from the inside lead-in area 2a. On the other hand, by adjusting the moving range of the optical pick up 1, the optical pick up 1 can read out information signals from the inside lead-in area 2a.

Figure 4:
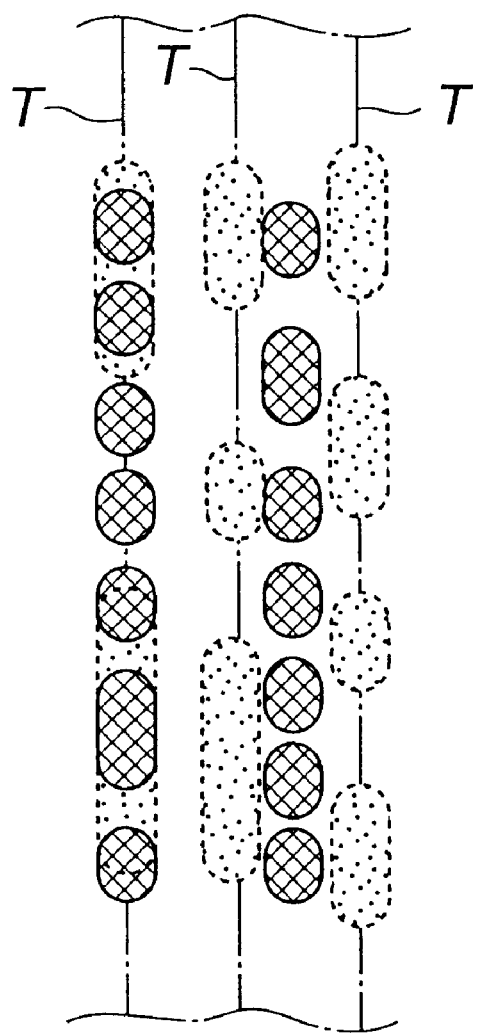
FIG. 4 shows a plan view of pit strings and identification signal written over and between the pit strings by the recording medium recognition information recording method.

It can be considered that the recognition information recording area may be over the pit strings (recording tracks) Ts in the lead-in area 2b, as shown in FIG. 4. In this case, the identification information is recorded over the information signals recorded in the form of the pit strings. In case the recording identification information is over the pit strings Ts, the recognition information recording area may be in the signal recording area which is located at the outside of the lead-in area 2b.

It is also considered that the recognition information recording area may be between the pit strings (recording tracks) Ts in the lead-in area 2b, as shown in FIG. 4. In case of recording identification information between the pit strings Ts, the recognition information recording area may also be in the signal recording area which is located at the outside of the lead-in area 2b.

Figure 5:
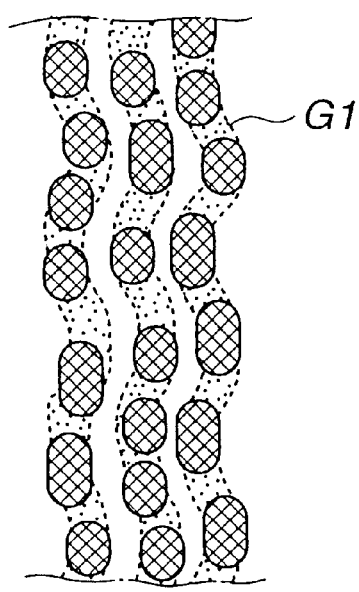
FIG. 5 shows a plan view of AC grooves and identification signal written over the AC grooves by the recording medium recognition information recording method.

When forming the recognition information recording area in the lead-in area 2b, the identification information may be written over "AC groove" G1 formed along wobbled lines, as shown in FIG. 5. Address information corresponds to the wobbles of the grooves. Address information can be detected by detecting the wobbles, and spindle servo controlling (controlling of rotational period of a spindle motor) can be performed based on the detected address information.

Figure 6:
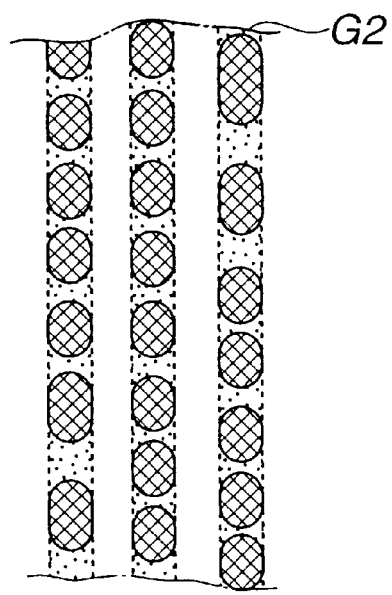
FIG. 6 shows a plan view of DC grooves and identification signal written over the AC grooves by the recording medium recognition information recording method.

When forming the recognition information recording area in the lead-in area 2b, the identification information may be written over "DC groove" G2 formed along lines having no wobble, as shown in FIG. 6. "DC groove" G2 with no wobble can easily be formed uniformly by a stamper.

When forming the recognition information recording area in the inside lead-in area 2a located at the inside of the lead-in area 2b, the identification information may be written over "AC groove" G1 formed along wobbled lines, as shown in FIG. 5. Also, In case of forming the recognition information recording area in the inside lead-in area 2a located at the inside of the lead-in area 2b, the identification information may be written over "DC groove" G2 formed along lines having no wobble, as shown in FIG. 6.

The recognition information is not restricted to information inherent in the recording media such as a serial number or ID number, and may be information of manufacture date or production slot number which can be modified by a unit of the number which is smaller than the number manufactured by one stamper.

As has been described heretofore, according to the recording medium recognition information recording method, recording medium recognition information recording apparatus, and recording disc of the present invention, in recording digitized recognition information to the recognition information recording area, the "1" is modulated to a signal having a first frequency and the "0" is modulated to a signal having a second frequency, or either the "1" or "0" is modulated to a signal having a constant frequency and the other is modulated to a non-signal state.

Thus recorded identification information can be a serial number or ID number inherent in the recording media, and can be read out by an optical pick up for reading out information signals recorded on a recording medium in the form of the pit strings. The identification information cannot be erased or rewritten by an optical head or magnetic head for performing magnetic recording or photomagnetic recording.

Thus, the present invention can provide a recording medium recognition information recording method and a recording medium recognition information recording apparatus for realizing a unique recording medium having identification information such as a serial number or ID number inherent in the recording media as information signals recorded thereon, which is prevented from being easily erased or rewritten, without inducing the complexity of an optical disc reproducing apparatus in its configuration and the intricacy of the reading-out operation, and can provide a recording disc as such a unique recording medium.

What is claimed is:

1. A recording medium recognition information recording method for recording recognition information to a recording medium which has a recognition information recording area for recording the recognition information, at least the recognition information recording area being capable of additionally having information recorded thereto, wherein, in recording digitized recognition information to the recognition information recording area, the "1" is modulated to a signal having a first frequency and the "0" is modulated to a signal having a second frequency, and the signals corresponding to their respective frequencies are written to the recognition information recording area.

2. The recording medium recognition information recording method as set forth in claim 1, wherein the recording medium is a pit disc which has a molded disc substrate on which pits are formed by a stamper and a reflective film adhered to the disc substrate, the reflective film being made of an aluminum-germanium alloy, and wherein the recognition information is additionally recorded to the recognition information recording area by irradiating a beam to the reflective film and changing the quality thereof.

3. A recording medium recognition information recording method for recording recognition information to a recording medium which has a recognition information recording area for recording the recognition information, at least the recognition information recording area being capable of additionally having information recorded thereto, wherein, in recording digitized recognition information to the recognition information recording area, either the "1" or "0" is modulated to a signal having a constant frequency and the other is modulated to a non-signal state, and the signals corresponding to the constant frequency and the non-signal state are written to the recognition information recording area.

4. The recording medium recognition information recording method as set forth in claim 3, wherein the recording medium is a pit disc which has a molded disc substrate on which pits are formed by a stamper and a reflective film adhered to the disc substrate, the reflective film being made of an aluminum-germanium alloy, and wherein the recognition information is additionally recorded to the recognition information recording area by irradiating a beam to the reflective film and changing the quality thereof.

5. A recording medium recognition information recording apparatus for recording recognition information to a recording medium loaded therein, the recording medium having a recognition information recording area for recording the recognition information, at least the recognition information recording area being capable of additionally having information recorded thereto, the recording medium recognition information recording apparatus comprising:

means for recording digitized recognition information to the recognition information recording area, the recognition information recording means modulating the "1" to a signal having a first frequency and modulating the "0" to a signal having a second frequency, and writing the signals corresponding to their respective frequencies to the recognition information recording area.

6. The recording medium recognition information recording apparatus as set forth in claim 5, wherein the loaded recording medium is a pit disc which has a molded disc substrate on which pits are formed by a stamper and a reflective film which is made of an aluminum-germanium alloy and adhered to the disc substrate, and wherein the recognition information recording means additionally records the recognition information to the recognition information recording area by irradiating a beam to the reflective film and changing the quality thereof.

7. A recording medium recognition information recording apparatus for recording recognition information to a recording medium loaded therein, the recording medium having a recognition information recording area for recording the recognition information, at least the recognition information recording area being capable of additionally having information recorded thereto, the recording medium recognition information recording apparatus comprising:

means for recording digitized recognition information to the recognition information recording area, the recognition information recording means modulating either the "1" or "0" to a signal having a constant frequency and modulating the other to a non-signal state, and writing the signals corresponding to the constant frequency and the non-signal state to the recognition information recording area.

8. The recording medium recognition information recording apparatus as set forth in claim 7, wherein the loaded recording medium is a pit disc which has a molded disc substrate on which pits are formed by a stamper and a reflective film which is made of an aluminum-germanium alloy and adhered to the disc substrate, and wherein the recognition information recording means additionally records the recognition information to the recognition information recording area by irradiating a beam to the reflective film and changing the quality thereof.

9. A recording disc which has a recognition information recording area for recording recognition information, at least the recognition information recording area being capable of additionally having information recorded thereto, the recognition information recording area having digitized recognition information recorded therein, wherein, of the digitized recognition information recorded in the recognition information recording area, the "1" is modulated to a signal having a first frequency and the "0" is modulated to a signal having a second frequency, and the signals corresponding to their respective frequencies are written to the recognition information recording area.

10. The recording disc as set forth in claim 9, wherein the recording disc is a pit disc which has a molded disc substrate on which pits are formed by a stamper and a reflective film adhered to the disc substrate, the reflective film being made of an aluminum-germanium alloy, and wherein the recognition information is additionally recorded to the recognition information recording area by irradiating a beam to the reflective film and changing the quality thereof.

11. A recording disc which has a recognition information recording area for recording recognition information, at least the recognition information recording area being capable of additionally having information recorded thereto, the recognition information recording area having digitized recognition information recorded therein, wherein, of the digitized recognition information recorded in the recognition information recording area, either the "1" or "0" is modulated to a signal having a constant frequency and the other is modulated to a non-signal state, and the signals corresponding to the constant frequency and the non-signal state are written to the recognition information recording area.

12. The recording disc as set forth in claim 11, wherein the recording disc is a pit disc which has a molded disc substrate on which pits are formed by a stamper and a reflective film adhered to the disc substrate, the reflective film being made of an aluminum-germanium alloy, and wherein the recognition information is additionally recorded to the recognition information recording area by irradiating a beam to the reflective film and changing the quality thereof.

\* \* \* \* \*